United States Patent
Gandolfi et al.

(10) Patent No.: US 7,423,854 B2
(45) Date of Patent: Sep. 9, 2008

(54) INTERRUPTION CIRCUIT WITH IMPROVED SHIELD

(75) Inventors: Paul R. Gandolfi, Dade City, FL (US); Frank S. Brugner, Jr., Clearwater, FL (US)

(73) Assignee: Technology Research Corporation, Clearwater, FL (US)

( * ) Notice: Subject to any disclaimer, the term of this patent is extended or adjusted under 35 U.S.C. 154(b) by 0 days.

(21) Appl. No.: 11/482,285

(22) Filed: Jul. 7, 2006

(65) Prior Publication Data
US 2008/0007878 A1    Jan. 10, 2008

(51) Int. Cl.
*H02H 3/00* (2006.01)
*H02H 9/08* (2006.01)

(52) U.S. Cl. .............. 361/42; 361/44; 361/45; 361/49; 361/50; 361/93.1

(58) Field of Classification Search ............ 361/42, 361/44–45, 47, 49–50, 93.1
See application file for complete search history.

(56) References Cited

U.S. PATENT DOCUMENTS

| | | | |
|---|---|---|---|
| 3,590,325 A | 6/1971 | McMillen | |
| 3,619,668 A | 11/1971 | McQueen et al. | |
| 3,657,603 A | 4/1972 | Adams | |
| 3,719,859 A | 3/1973 | Frantz et al. | |
| 3,784,846 A | 1/1974 | Krick et al. | |
| 3,814,991 A | 6/1974 | Hewitt | |
| 3,950,675 A | 4/1976 | Weber et al. | |
| 3,996,496 A | 12/1976 | Volk, Jr. | |
| 4,038,061 A | 7/1977 | Anderson et al. | |
| 4,122,413 A | 10/1978 | Chen | |
| 4,131,927 A | 12/1978 | Tsuchiya et al. | |
| 4,205,358 A | 5/1980 | Washington | |
| 4,281,358 A | 7/1981 | Plouffe et al. | |
| 4,352,998 A | 10/1982 | Baker et al. | |
| 4,415,943 A | 11/1983 | Wortman | |
| 4,424,544 A | 1/1984 | Chang et al. | |
| 4,502,287 A | 3/1985 | Hare et al. | |
| 4,543,527 A | 9/1985 | Schuchmann et al. | |
| 4,554,463 A | 11/1985 | Norbeck et al. | |
| 4,580,186 A | 4/1986 | Parker et al. | |

(Continued)

OTHER PUBLICATIONS

Belden Inc. Belden Electronics Division Catalog. Ref. MCAT-2003. Copyright Belden Inc. 2003.

*Primary Examiner*—Michael J Sherry
*Assistant Examiner*—Dharti H Patel
(74) *Attorney, Agent, or Firm*—Frijouf, Rust & Pyle, P.A.

(57) ABSTRACT

An interrupter circuit is disclosed for interrupting power in a power cable from a power source. The power cable comprises an insulated line wire and an insulated neutral wire with a conductive shield surrounding the line wire and the neutral wire. A non-insulated drain wire contacts the conductive shield. An outer insulating layer is molded about the conductive shield. A disconnect switch is interposed between the power source and the power cable with a disconnect switch driver controlling the disconnect switch. A sensing circuit is connected between the drain wire and the disconnect switch driver for sensing a leakage current between the conductive shield and one of the insulated line wire and the insulated neutral wire for opening the disconnect switch for disconnecting the power cable from the power source.

16 Claims, 7 Drawing Sheets

U.S. PATENT DOCUMENTS

| | | | |
|---|---|---|---|
| 4,584,623 A | 4/1986 | Bello et al. | |
| 4,717,841 A | 1/1988 | Dumortier et al. | |
| 4,858,056 A | 8/1989 | Russell | |
| 4,931,894 A * | 6/1990 | Legatti | 361/45 |
| 4,947,278 A | 8/1990 | Nichols, III | |
| 4,979,070 A | 12/1990 | Bodkin | |
| 5,037,999 A | 8/1991 | VanDeusen | |
| 5,065,104 A | 11/1991 | Kusko et al. | |
| 5,107,076 A | 4/1992 | Bullock et al. | |
| 5,132,491 A | 7/1992 | Mulrooney et al. | |
| 5,142,428 A | 8/1992 | Takeda | |
| 5,208,426 A | 5/1993 | Kennedy et al. | |
| 5,212,350 A | 5/1993 | Gebs | |
| 5,216,202 A | 6/1993 | Yoshida et al. | |
| 5,229,730 A | 7/1993 | Legatti et al. | |
| 5,237,480 A | 8/1993 | Dara | |
| 5,254,188 A | 10/1993 | Blew | |
| 5,262,691 A | 11/1993 | Bailey et al. | |
| 5,293,001 A | 3/1994 | Gebs | |
| 5,329,064 A | 7/1994 | Tash et al. | |
| 5,365,394 A | 11/1994 | Gomez Ibarguengoitia | |
| 5,391,836 A | 2/1995 | Bortas et al. | |
| 5,416,268 A * | 5/1995 | Ellis | 174/36 |
| 5,418,678 A | 5/1995 | McDonald | |
| 5,455,469 A | 10/1995 | Ward | |
| 5,459,336 A | 10/1995 | Kato | |
| 5,463,521 A | 10/1995 | Love | |
| 5,528,445 A | 6/1996 | Cooke et al. | |
| 5,600,524 A | 2/1997 | Neiger et al. | |
| 5,661,623 A | 8/1997 | McDonald et al. | |
| 5,774,316 A | 6/1998 | McGary et al. | |
| 5,847,913 A | 12/1998 | Turner et al. | |
| 5,889,643 A | 3/1999 | Elms | |
| 6,002,563 A | 12/1999 | Esakoff et al. | |
| 6,014,297 A | 1/2000 | Clarey et al. | |
| 6,057,996 A | 5/2000 | Kim | |
| 6,091,591 A | 7/2000 | Heinz et al. | |
| 6,111,732 A | 8/2000 | Beland | |
| 6,111,733 A | 8/2000 | Neiger et al. | |
| 6,218,647 B1 | 4/2001 | Jones | |
| 6,252,365 B1 | 6/2001 | Morris et al. | |
| 6,262,871 B1 | 7/2001 | Nemir et al. | |
| 6,265,667 B1 | 7/2001 | Stipes et al. | |
| 6,292,337 B1 | 9/2001 | Legatti et al. | |
| 6,381,113 B1 | 4/2002 | Legatti | |
| 6,404,265 B1 | 6/2002 | Guido, Jr. et al. | |
| 6,414,829 B1 | 7/2002 | Haun et al. | |
| 6,504,691 B1 | 1/2003 | Matsui et al. | |
| 6,525,914 B1 | 2/2003 | Legatti | |
| 6,697,238 B2 | 2/2004 | Bonilla et al. | |
| 6,807,036 B2 | 10/2004 | Baldwin | |
| 6,829,123 B2 | 12/2004 | Legatti et al. | |
| 6,850,394 B2 * | 2/2005 | Kim | 361/42 |
| 7,136,266 B2 * | 11/2006 | Gershen et al. | 361/42 |
| 2002/0145838 A1 | 10/2002 | Bonilla et al. | |
| 2003/0202310 A1 | 10/2003 | Field et al. | |
| 2004/0037018 A1 | 2/2004 | Kim | |
| 2004/0070895 A1 | 4/2004 | Gershen et al. | |
| 2004/0070899 A1 | 4/2004 | Gershen et al. | |
| 2004/0190686 A1 | 9/2004 | Tidwell et al. | |

* cited by examiner

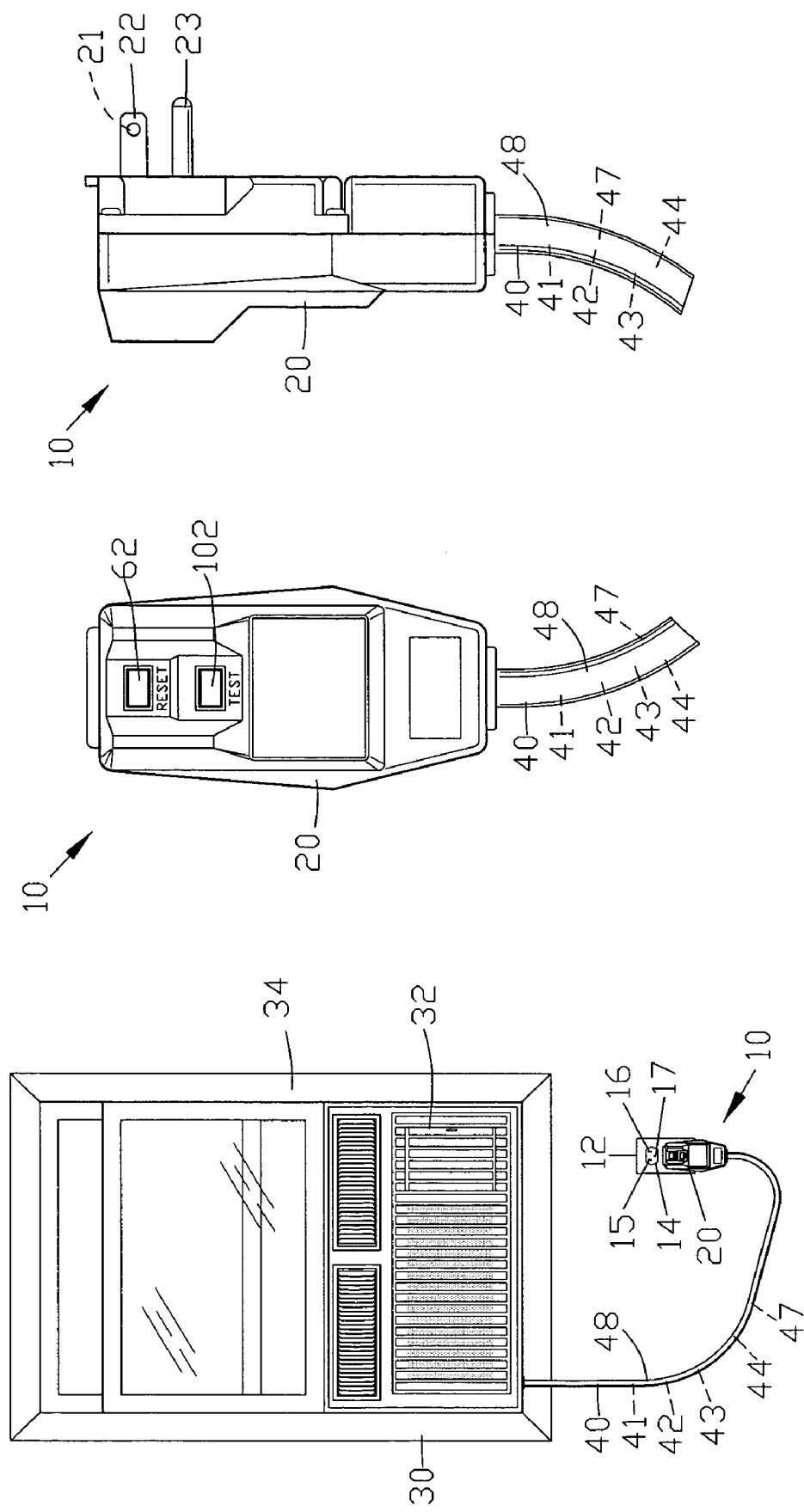

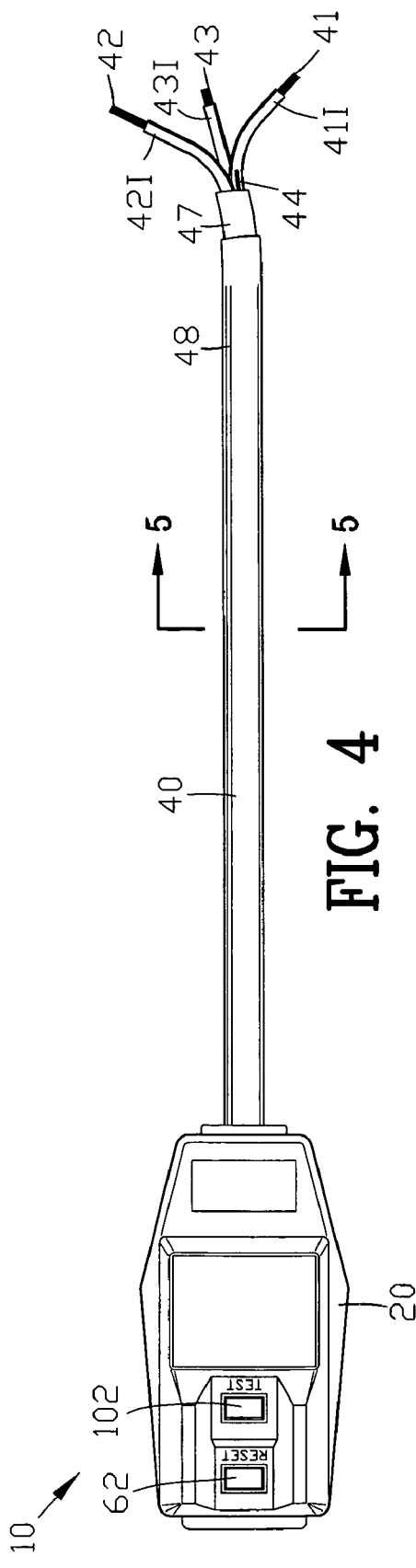
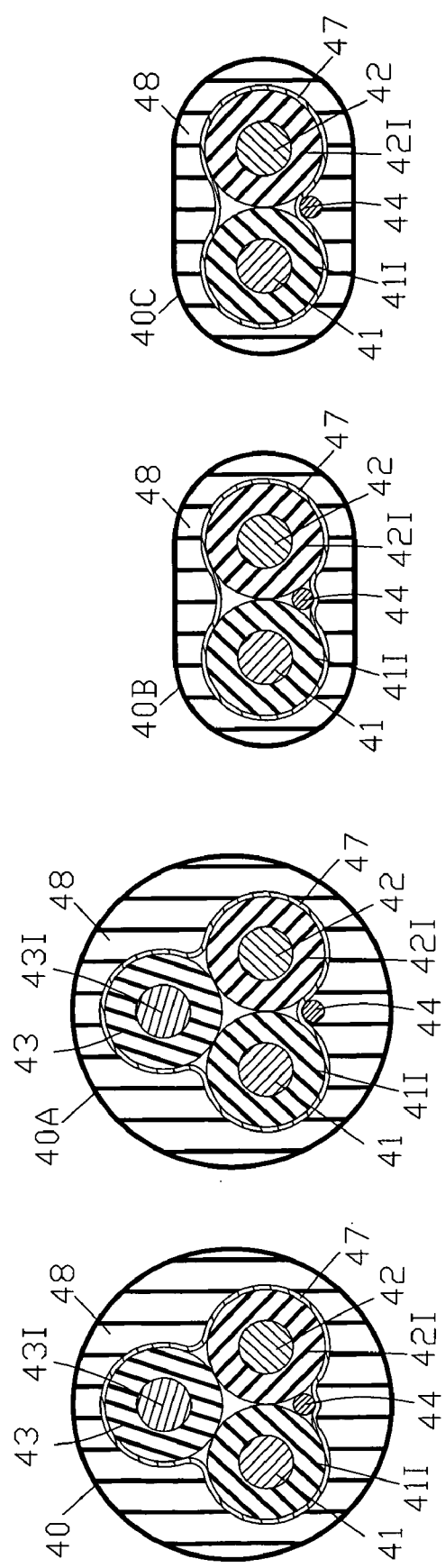
FIG. 4
FIG. 5
FIG. 6
FIG. 7
FIG. 8

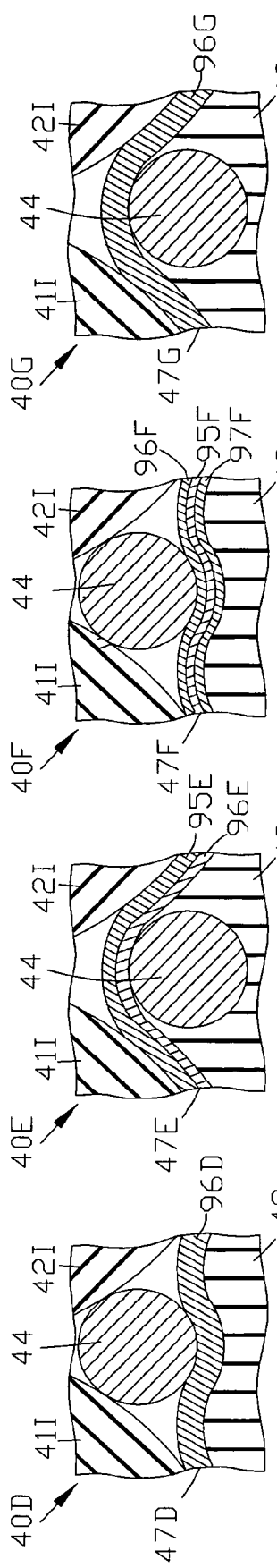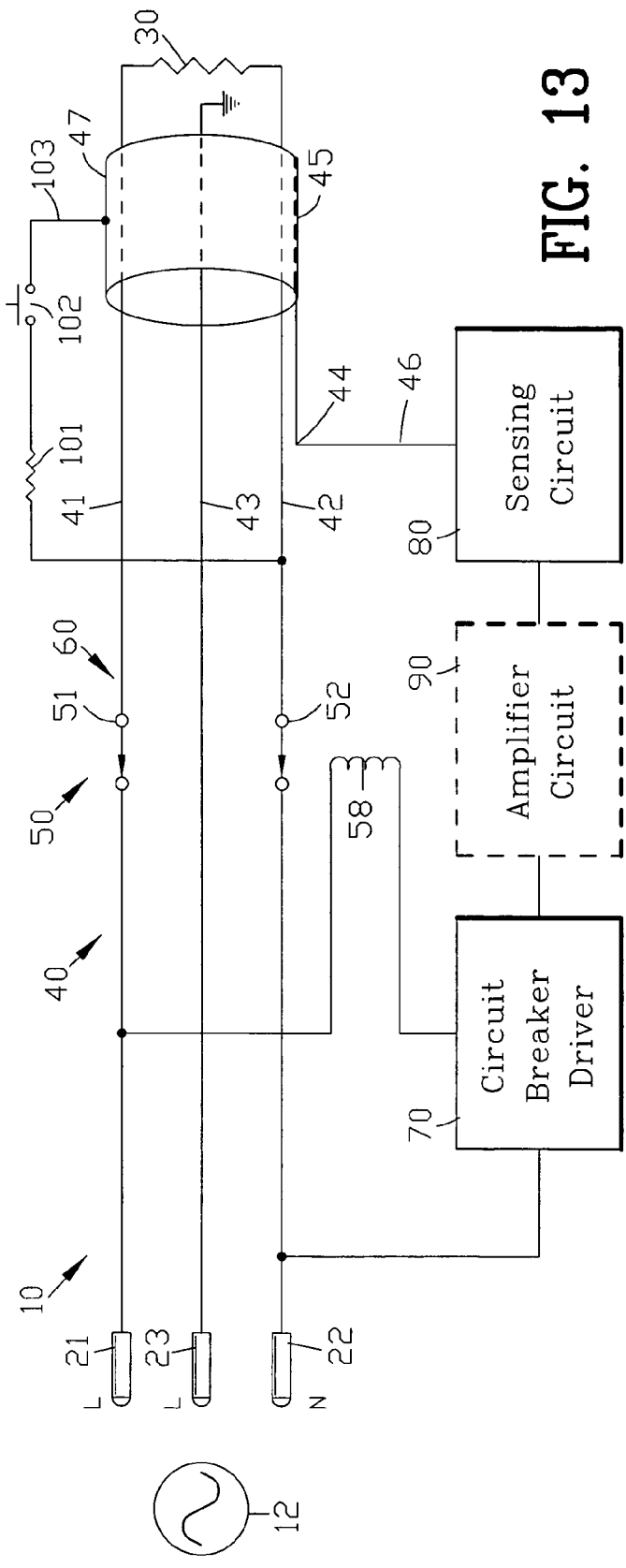

INTERRUPTION CIRCUIT WITH IMPROVED SHIELD

BACKGROUND OF THE INVENTION

1. Field of the Invention

This invention relates to electrical power circuit and more particularly to a circuit for disconnecting a power source upon the detection of a leakage current.

2. Background of the Invention

Various types of electrical protective devices have been proposed by the prior art for reducing the possibility of dangerous electrical shocks as well as the possibility of electrical fires. One general class of prior art electrical protective devices is a commonly referred to as a ground fault circuit interrupter (GFCI). A ground fault circuit interrupter disconnects a power source upon the detection of an undesired grounding of a power line, such as by a person inadvertently being connected between the power line and a ground. Other types of types of electrical protective devices include appliance leakage current interrupters (ALCIs), equipment leakage current interrupters (ELCIs) and immersion detection circuit interrupters (IDCIs). Underwriters Laboratories, Inc. classifies electrical protective devices as Leakage Current Protection Devices, in Reference Standard UL943A. The following United States patents are representative of leakage current protection devices of the prior art.

U.S. Pat. No. 4,131,927 to Tsuchiya, et al. discloses a current surge, normally associated with the initial application of a nominal A.C. current to an inductive load, for preventing the magnetic core of the inductive load from being driven into saturation. Initially, the current is half wave rectified and amplitude limited. The amplitude limitation insures that the core will not be driven into saturation. A voltage detector connected across the inductive load senses only the counter E.M.F. of a polarity opposite to the polarity of the half wave current. When the sensed voltage reaches a predetermined value, a direct connection is provided between the A.C. supply and the inductive load, bypassing the half wave rectifier and the amplitude limiter.

U.S. Pat. No. 4,352,998 to Baker, et al. discloses a common mode rejection coupler in a power switching system having a variable common mode voltage including a first optical isolator circuit for receiving an input signal and generating in response thereto a first signal which is normally isolated with respect to the common mode voltage. A second optical isolator circuit receives the complement of the input signal and generates a second signal which is also normally isolated with respect to the common mode voltage. The first and second signals are the complement of one another. A comparator receives the first and second signals and generates an output signal which changes state only when the first and second signals complement states. Feedback control circuitry for the comparator is provided for limiting transient changes in one of the first and second signals to prevent the comparator from changing output states when a transient change occurs in one of the first and second signals resulting from a change in the common mode voltage.

U.S. Pat. No. 4,424,544 to Chang, et al. discloses an optically toggled bidirectional normally-on switch with protection against bilateral voltage and bidirectional current surges by the inclusion of a pair of oppositely poled thyristors. One version uses a large junction-type field-effect transistor in its main path and a pair of smaller junction-type transistors in the subsidiary path. A photodiode array controls the gate voltage on each of the transistors and turns them off when illuminated. A control node in the subsidiary path is connected to the gates of the SCRs so that excess current in this path turns on the appropriately-poled thyristor to provide an additional shunt path for the current.

U.S. Pat. No. 4,554,463 to Norbeck, et al. discloses a trigger circuit for gating on a semiconductor switch. The power dissipated in the trigger circuit is minimized by employing a constant current source to provide the gate trigger current. This assures adequate triggering regardless of supply voltage variations or switch intrinsic control voltage requirements. Power is saved by supplying only the current required to drive the semiconductor switch on thereby preventing overdrive. With constant d-c gate current, the precise amount of power needed to turn on and close the switch is provided while wasting relatively little energy due to gate intrinsic voltage variations of the switch or to input line voltage variations.

U.S. Pat. No. 4,717,841 to Dumortier, et al. discloses a static power switch circuit having a power switch member. The static power switch has a bidirectional power switch with at least one controlled semiconductor of the thyristor or triac type with power terminals connected to an AC source in series with a load and a circuit for controlling the power switch member having a first control switch whose current path is connected to the gate of the power semiconductor through a full wave rectifier bridge. This switch is connected to a circuit able to generate control energy of the switch in response to an input signal.

U.S. Pat. No. 5,262,691 to Bailey, et al. discloses an apparatus for responding to a shorted gate in a gate turnoff thyristor. The gate electrode of which is connected by means of a controllable switch to a control voltage terminal having a negative potential with respect to the cathode potential of the thyristor. The controllable switch is arranged to conduct negative gate current in response to a thyristor turnoff command. A voltage comparing means is coupled to the controllable switch for detecting when the switch is conducting negative gate current of relatively high magnitude. Timing means is active for a predetermined interval following the start of the thyristor turnoff command, and logic means is operative to cause the switch to stop conducting negative gate current if the voltage comparing means detects high gate current at the end of such interval.

U.S. Pat. No. 5,365,394 to Ibarguengoitia discloses a protective electronic relay of the type which includes a feed source with a one-phase transformer, rectifying bridge, filter condenser and voltage regulator. Pickups are provided where one-phase signals are generated, connected to some diodes, connected to some capacitors and to a zener diode for the purpose of obtaining rectified, filtered and limited signals with a voltage level proportional to the line intensity of the protected motor. A multiple microswitch connected to some resistors permits presetting of the voltage level and nominal triggering intensity of a relay. An R-C network that can be timed in various scales comprised of resistors a capacitor and another multiple microswitch allows adjustment of the triggering time constant and is applied to that voltage level at the non-inverting input of an operational amplifier whose inverting input is at a reference voltage. Upon the non-inverting input of the operational amplifier reaching the reference voltage, due to a symmetric overload, the output of the operational amplifier passes to logic state 1. This sends a positive signal to the gate of a thyristor, driving it into conduction and depolarizing the base of a transistor making it pass from saturation to cut-off. As a result a relay connected to the collector of the transistor is triggered, changing the state of its contacts and causing disconnection of the protected motor.

U.S. Pat. No. 5,418,678 to McDonald discloses an improved ground fault circuit interrupter (GFCI) device requiring manual setting following initial connection to an AC power source or termination of a power source interruption. The improved GFCI device utilizes a controlled switching device which is responsive to a load power signal for allowing the relay contact sets of the GFCI device to be closed only when power is being made available at the output or load terminals. The controlled switching device preferably comprises an opto-isolator or other type of switching device which provides isolation between the GFCI input and output terminals when the relay contact sets are open. The improved GFCI device may be incorporated into portable units, such as plug-in or line cord units, for use with unprotected AC receptacles.

U.S. Pat. No. 5,459,336 to Kato discloses a semiconductor photocoupler composed of a light emitting element and a light receiving element. Wavelength of emitted light changes as a function of exciting current intensity of the light emitting element, and capacitance of the light receiving element changes as a function of wavelength of receiving light and ceases the capacity change as the receiving light disappears. Signals are transmitted in current-light-capacity type transmission with memory action in the light receiving element.

U.S. Pat. No. 5,463,521 to Love discloses an apparatus for protecting electronic circuit elements from hazardous voltages. The apparatus includes a source of electrical energy that produces electrical energy having a predetermined energy level. An electrical load is connected to the electrical energy source and responsively receives electrical energy. A signaling device receives electrical energy from the electrical energy source and produces an overvoltage signal in response to receiving electrical energy greater than the predetermined energy level. A NMOSFET is connected to the electrical load, and controllably regulates the electrical current flowing through the electrical load. A control device receives the overvoltage signal and responsively controls the operation of the NMOSFET.

U.S. Pat. No. 5,528,445 to Cooke, et al. discloses a fault current protection system for a traction vehicle propulsion system including a synchronous generator having armature and field windings and power conditioning circuitry connecting the generator armature windings to a traction motor employing a normally charged capacitor which, in response to a fault signal resulting from excess current in the generator armature windings, is electrically switched into parallel with the excitation current source connected to the generator field windings so as to discharge through the generator field windings and commutate the excitation current source.

U.S. Pat. No. 5,661,623 to McDonald, et al. discloses a ground fault circuit interrupter (GFCI) line cord plug utilizing an electronically latched relay, rather than a disconnect switch or other type of mechanical latching device, to interrupt the AC load power when a ground fault condition occurs. In order to reduce the size of the relay and minimize the cost and complexity of the GFCI plug, the fixed and movable relay contact structures are mounted directly to the circuit board which carries the remaining components of the GFCI circuit. In a preferred embodiment, the fixed relay contact structures are integral with the plug blades of the GFCI plug. The movable relay contact structures preferably comprise deflectable spring arms which are preloaded when the relay contacts are in the open position in order to control the contact gap, and which are deflected past the point of contact closure when the relay contacts are in the closed position in order to increase the closing force. The principal electrical components of the GFCI plug, including the relay contacts, relay coil and sensing transformer, are mounted on the circuit board in a generally tandem or in-line arrangement in order to minimize the dimensions of the plug.

U.S. Pat. No. 6,002,563 to Esakoff, et al. discloses an improved plug-in power module for providing a controlled amount of electrical power to one or more remote lighting fixtures or other load. The module is configured to sense a ground fault or other current imbalance at the load and, in response, both to trigger the module's disconnect switch to open and to report the occurrence of such a ground fault to a central location. The power module achieves these important functions without adding unduly to the module's complexity or size.

U.S. Pat. No. 6,218,647 to Jones discloses an ice and snow melting system including at least one sensor configured for sensing a temperature or moisture associated with an ambient environment and providing a signal indicative thereof. A heater for melting the ice and snow includes a heater wire, a layer of insulation substantially surrounding the heater wire, and a conductive shield substantially surrounding the layer of insulation. A ground fault circuit interrupter is coupled with the shield of the heater. The ground fault circuit interrupter detects a ground fault condition between the heater wire and the conductive shield and provides a signal indicative thereof. An automatic controller is connected to the at least one sensor. The controller includes heater control circuitry receiving each of the sensor signal and the ground fault circuit interrupter signal. The heater control circuitry selectively controls operation of the heater dependent upon the sensor signal and the ground fault circuit interrupter signal.

U.S. Pat. No. 6,252,365 to Morris, et al. discloses a combination disconnect switch/motor starter including a disconnect switch trip unit having a microprocessor and at least one removably connectable contactor or other functional module. The functional module is encoded with an identifier, such that the microprocessor can determine the type of functional module and appropriate configuration parameters, such as trip times, for the particular application of the functional module. Power is supplied continuously to the trip unit during motor overload or short circuit conditions.

U.S. Pat. No. 6,404,265 to Guido, Jr., et al. discloses a trigger circuit for triggering a silicon device having a control terminal, where the silicon device is subject to variations in the intrinsic control requirements. The trigger circuit comprises a source of direct current (DC) supply voltage, and a DC-to-DC current mode Buck converter for converting the supply voltage into an output DC current not subject to undesired variations due to variations in the supply voltage, the Buck converter supplying to the control terminal a minimum current to turn on the silicon device despite the variations in the intrinsic control requirements. The silicon device may comprise a silicon controlled rectifier (SCR) with a gate terminal, an anode terminal, and a cathode terminal, and wherein the control terminal is the gate terminal, and wherein the variations in the intrinsic control requirements are variations in the intrinsic gate-to-cathode control current and voltage requirements.

U.S. Pat. No. 6,414,829 to Haun, et al. discloses a system for producing a simulated ground fault when arcing is present in an electrical circuit. The system includes a sensor which monitors the electrical circuit. An arcing fault detection circuit determines whether an arcing fault is present in response to the sensor and produces a trip signal in response to a determination that an arcing fault is present in the electrical circuit. A ground fault simulator circuit produces a simulated ground fault in response to the trip signal.

U.S. Pat. No. 6,697,238 and U.S. Patent Application 20020145838 to Bonilla, et al. disclose a GFCI that has secondary test switch contacts. In case closing of the primary test switch contacts fails to trip the GFCI, subsequent closing of the secondary test switch contacts results in a short circuit between the AC input terminals of the GFCI. The short circuit blows a fuse disposed on the line side of the GFCI. The blowing of the fuse disables the GFCI and/or provides an indication to the user that the GFCI is defective.

U.S. Patent Application 20030202310 to George, et al. discloses a method and apparatus for improving the fault protection of a monitor circuit by coupling an input protection circuit to an output section. The input protection circuit may include a fusible device that limits or removes a fault condition present at an input to the input protection circuit. The fusible device may be, for example, a resettable positive temperature coefficient ("PTC") device configured to limit the current passing through it to a predetermined level once it reaches a predetermined temperature. A resistive element may be thermally coupled to the PTC device to assist it reaching the predetermined temperature. The monitor circuit may further be configured to generate a sensory signal in response to a fault condition.

U.S. Patent Application 20040037018 to Kim discloses a GFCI mis-wiring detector including a set of input terminals for an AC source, and a set of output terminals for an AC load. The set of output terminals are conductively connected to the set of input terminals. A GFCI circuit has one or more switches that selectively interrupt the connection between the set of input terminals and the set of output terminals when a ground fault occurs. A miss-wiring detection circuit causes the one or more switches of the GFCI circuit to open when the AC source is electrically coupled to the set of output terminals for a first time interval, even if there is no imbalance in the current flow. Additionally, a suppression circuit suppresses operation of the miss-wiring detection circuit when the AC source is electrically coupled to the input terminals for a second time interval. The second time interval is less than the first time interval.

U.S. Patent Application 20040070895 to Gershen, et al. discloses a SCR, which is used to fire a coil. The coil uses the ground conductor and diodes as the return path to fire the coil to interrupt the voltage from the load. A fully shielded cord is used to detect a break in a conductor. An LED indicator in either the plug or the receptacle of the extension cord verifies that protection is available. A test button is provided to test shield continuity and to verify proper circuit operation.

U.S. Patent Application 20040070899 to Gershen, et al. discloses basic detection and interruption components of an Immersion Detection Circuit Interrupter (IDCI), in combination with the line, neutral and shield conductors of an extension or appliance cord provides a new improved type of detector. A Leakage Current Detector Interrupter (LCDI) interrupts current to a load when current leakage is detected between the line or neutral conductors of the cord and the shield conductor. The new improved LCDI detector provides, either singularly or in combination, the following advantages: prevents the LCDI from being reset should the device become inoperative (reset lockout); provides an indication of the integrity of the shield in the extension or appliance cord; tests the integrity of the shield within the extension or appliance cord, in addition to testing the functionality of the LCDI; interrupts current to the load if an electrical connection is detected between the shield and neutral, or the shield and ground, in addition to the existing detection of leakage current from the phase conductor; allows the LCDI to trip during an open neutral condition by utilizing the ground connection as a return wire for the trip coil; and/or provides immersion detection at the receptacle end of the extension cord in addition to protection from leakage faults.

U.S. Patent Application 20040190686 to Tidwell, et al. discloses an apparatus to determine whether or not protection circuitry for a span-powered remote digital subscriber loop unit is properly connected to earth ground by the deliberate assertion and detection of a ground fault from a central office line card location. The span-powered remote unit is augmented to place a controllable conduction path in circuit with the span-powered loop and an earth ground pin. If the earth ground pin has been properly connected to earth ground, applying the conductive path will place a ground fault on the span, which is detected by a ground fault detector within the central office line card. If the ground fault detector does not detect a ground fault in response to the application of the conductive path, the line card forwards a negative ground fault event message to a test center, so that a service technician may be dispatched to the remote unit to correct the problem.

Therefore, it is an object of the present invention to provide a circuit for disconnecting a power source upon the detection of a leakage current that provides a significant improvement in the electrical art.

Another object of this invention is to provide a circuit for disconnecting a power source upon the detection of a leakage current that incorporates an improved conductive shield for the detection of a leakage current.

Another object of this invention is to provide a circuit for disconnecting a power source upon the detection of a leakage current that is more economical than similar units of the prior art.

Another object of this invention is to provide a circuit for disconnecting a power source upon the detection of a leakage current that may be incorporated into existing line cord packages.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved interrupter circuit for interrupting power from a power source. The interrupter circuit comprises a power cable having an insulated line wire and an insulated neutral wire. The power cable has a conductive shield surrounding the insulated line wire and the insulated neutral wire. A drain wire has a first and a second portion with the first portion of the drain wire being non-insulated and in contact with the conductive shield. An outer insulating layer is molded about the conductive shield. A disconnect switch is interposed between the power source and the power cable. A disconnect switch driver controls the disconnect switch. A sensing circuit is connected between the second portion of the drain wire and the disconnect switch driver for sensing a leakage current between the conductive shield and one of the insulated line wire and the insulated neutral wire for opening the disconnect switch for disconnecting the power cable from the power source.

In a more specific embodiment of the invention, the conductive shield may be a metallic foil such as an aluminum foil or may be a metallic mesh. In one example, the drain wire has a first and a second portion with the first portion of the drain wire being non-insulated and in contact with the conductive shield. Preferably, the first portion of the drain wire extends along substantially the total length of the conductive shield. In one example, the drain wire is located internal to the conductive shield. In an alternate example, the drain wire is located external to the conductive shield. The outer insulating layer of the power cable establishes a mechanical engagement between the first portion of the drain wire and the conductive shield to provide an electrical connection between the drain wire and the conductive shield.

The disconnect switch may comprise a disconnect switch coil for changing the disconnect switch from a closed position connecting the power cable to the power source and an open position for disconnecting the power cable from the power source. The disconnect switch driver interconnects the sensing circuit with the disconnect switch coil for changing the disconnect switch into the open position upon the sensing circuit sensing the leakage current for disconnecting the power cable from the power source. Preferably, the disconnect switch driver comprises a thyristor connected in series with the disconnect switch for changing the disconnect switch into the open position upon conduction of the thyristor.

In one example, the sensing circuit comprises a resistor interconnecting the second portion of the drain wire to a voltage source. The disconnect switch driver is connected to the resistor for opening the disconnect switch upon a leakage current flowing between the conductive shield and one of the insulated line wire and the insulated neutral wire and through the resistor.

In another example, the sensing circuit comprises a voltage divider network having a voltage divider node. A first section of the voltage divider network is connected for providing a voltage at the voltage divider node. A second section of the voltage divider network is connected to the second portion of the drain wire. The voltage divider node of the voltage divider network is connected to the disconnect switch driver.

In still another example, the sensing circuit includes a differential transformer comprising a transformer core having a core opening. A first primary winding comprising the insulated line conductor and the insulated neutral conductor extend through the core opening. A second primary winding is wound about the transformer core connected to the drain wire. A secondary winding is wound about the transformer core connected to the disconnect switch driver for opening the disconnect switch upon the secondary winding detecting an imbalance in the magnetic flux in the transformer core. The secondary winding opens the disconnect switch upon the secondary winding detecting the leakage current flowing between the conductive shield and one of the insulated line wire and the insulated neutral wire. The secondary winding opens the disconnect switch upon the secondary winding detecting an imbalance in the magnetic flux between the insulated line wire and the insulated neutral wire.

The interrupter circuit may be included with a housing molded from a polymeric material. The housing has a line lug and a neutral lug for insertion within a line socket and a neutral socket and the ground socket of the power source. The disconnect switch and the sensing circuit and the disconnect switch driver are located with in the housing.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is an elevational view of the circuit of the present invention connecting a power source to a load shown as an air conditioning unit;

FIG. 2 is an enlarged view of the a portion of FIG. 1 illustrating an electrical plug housing the circuit of the present invention;

FIG. 3 is a side view of FIG. 2;

FIG. 4 is a view of the electrical plug housing and power cable of FIG. 1 disconnected from the load;

FIG. 5 is an enlarged sectional view along line 5-5 in FIG. 4 of the power cable illustrating the line wire, the neutral wire, the ground wire and the drain wire located within the conductive shield;

FIG. 6 is a view similar to FIG. 5 of a power cable with the drain wire located outside of the conductive shield;

FIG. 7 is a view similar to FIG. 5 of an alternate embodiment of a power cable illustrating a line wire, a neutral wire and a drain wire located within the conductive shield;

FIG. 8 is a view similar to FIG. 7 of the power cable with the drain wire located outside of the conductive shield;

FIG. 9 is a first example of a conductive shield suitable for use in present invention;

FIG. 10 is a second example of a conductive shield suitable for use in present invention;

FIG. 11 is a third example of a conductive shield suitable for use in present invention;

FIG. 12 is a fourth example of a conductive shield suitable for use in present invention;

FIG. 13 is a block diagram of the interrupter circuit of the present invention for disconnecting an electrical power source upon the detection of a leakage current;

Similar reference characters refer to similar parts throughout the several Figures of the drawings.

DETAILED DISCUSSION

Figure 14:
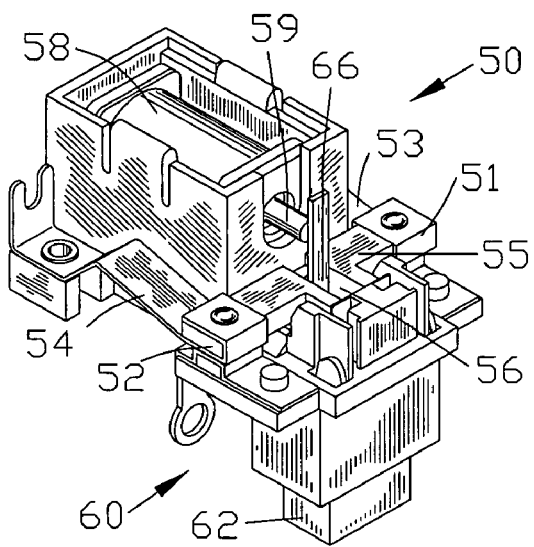
FIG. 14 is an isometric view of a disconnect switch in a closed position.

FIG. 1 is an elevational view of the circuit 10 of the present invention for disconnecting a power source 12 upon the detection of a leakage current. In this example, the power source 12 is shown as a conventional electrical receptacle 14. The conventional electrical receptacle 14 has a line socket 15, a neutral socket 16 and a ground socket 17.

The circuit 10 is contained within a housing 20 in the form of an electrical plug adapted for insertion within the conventional electrical receptacle 14. The housing 20 supports a line lug 21, a neutral lug 22 and a ground lug 23. The lugs 21-23 of the housing are adapted to be inserted into the sockets 15-17 of the receptacle 14. Preferably, the housing 20 is formed from a molded polymeric material. A load 30 is shown as an air conditioning unit 32 installed in a window 34. A power cable shown as a power cord 40 connects the circuit 10 within the housing 20 to the load 30.

FIGS. 2-4 are enlarged views of a portion of FIG. 1 further illustrating the circuit 10 contained within the housing 20. The circuit 10 connects the line lug 21, the neutral lug 22 and the ground lug 23 of the housing 20 to a line wire 41 and a neutral wire 42 and a grounding wire 43 of the power cable 40. The line wire 41, the neutral wire 42 and the grounding wire 43 are surrounded by insulations 41I-43I in a conventional fashion. A drain wire 44 defines a first and a second portion 45 and 46 and extends along the substantial totality of the power cable 40. A conductive shield 47 surrounds the line wire 41, the neutral wire 42 and the grounding wire 43. An outer insulating layer 48 is molded about the conductive shield 47.

As will be described in greater detail hereinafter, the circuit 10 disconnects the power source 12 from the load 30 upon the detection of a leakage current from any one of the line wire 41, the neutral wire 42 and the grounding wire 43 and the conductive shield 47.

FIG. 5 is an enlarged sectional view along line 5-5 in FIG. 4 illustrating the power cable 40 with the line wire 41, the neutral wire 42 and the grounding wire 43 surrounded within the conductive shield 47. In this embodiment, the drain wire 44 is located within the conductive shield 47. Preferably, the conductive shield 47 is a thin metallic foil such as an aluminum or copper foil or a thin metallic mesh such as an aluminum or copper mesh. The use of a single thin metallic foil or mesh substantially reduces the material cost over use of plural copper conductive shield surrounding the line wire and the neutral wire of the prior art. Furthermore, the use of a single thin aluminum foil substantially reduces the material cost over all known uses of copper conductive shield of the prior art.

The first portion 45 of the drain wire 44 is non-insulated and in contact with the conductive shield. The first portion 45 of the drain wire 44 extends along substantially the total length of the conductive shield 47. The second portion 46 of the drain wire 44 may or may not be insulated. Furthermore, the first portion 45 and the second portion 46 of the drain wire 44 may be two separate electrically interconnected wires (not shown). Preferably, the drain wire 44 is a thin braded copper or aluminum wire.

The outer insulating layer 48 establishes a mechanical engagement between the first portion 45 of the drain wire 44 and the conductive shield 47 to provide an electrical connection between the drain wire 44 and the conductive shield 47. Preferably, the outer insulating layer 48 resiliently urges the conductive shield 47 into mechanical engagement with the drain wire 44 to provide the electrical connection between the drain wire 44 and the conductive shield 47.

FIG. 6 is a view similar to FIG. 5 illustrating a power cable 40A with the line wire 41, the neutral wire 42 and the grounding wire 43 surrounded within the conductive shield 47. In this embodiment, the drain wire 44 is located outside of the conductive shield 47. The outer insulating layer 48 resiliently urges the drain wire 44 into mechanical engagement with the conductive shield 47 to provide the electrical connection between the drain wire 44 and the conductive shield 47.

FIG. 7 is a view similar to FIG. 5 of an alternate embodiment illustrating the power cable 40B having the line wire 41, the neutral wire 42 and the drain wire 44. In this embodiment, the drain wire 44 is located within the conductive shield 47. The power cable 40 is void of the ground wires 43 and 43 shown in FIG. 5-6. The outer insulating layer 48 resiliently urges the conductive shield 47 into mechanical engagement with the drain wire 44 to provide the electrical connection between the drain wire 44 and the conductive shield 47.

FIG. 8 is a view similar to FIG. 7 of another embodiment illustrating the power cable 40C having the line wire 41, the neutral wire 42 and the drain wire 44. In this embodiment, the drain wire 44 is located outside of the conductive shield 47. The outer insulating layer 48 resiliently urges the drain wire 44 into mechanical engagement with the conductive shield 47 to provide the electrical connection between the drain wire 44 and the conductive shield 47.

It should be appreciated by those skilled in the art that the present invention is not limited to the cross-sectional shape of the power cord 40 or the specific types of wires and/or insulations described and illustrated herein.

FIGS. 9-12 illustrate various examples of conductive shields 47D-47G suitable for use with the present invention. The conductive shields 47D-47G are shown as thin conductive materials 96D-96G. Typically, the thin conductive materials 96D-96G of the conductive shields 47D-47G are unsuitable for direct connection to the interrupter circuit 10.

The drain wires 44 facilitate electrical connection between the conductive shields 47D-47G and the interrupter circuit 10 of the present invention. The first portion 45 of the drain wire 44 extends along the length of the power cable 40 for electrically connecting the drain wire 44 to the conductive shields 47D-47G. The second portion 46 of the drain wire 44 provides a suitable conductor for connection to the interrupter circuit 10.

The use of thin conductive shields 47D-47G, substantially reduces the material cost over the use of plural conductive shield surrounding the first wire and the second wire of the prior art. Furthermore, the use of an aluminum material for the conductive shields 47D-47G substantially reduces the material cost over the use a copper material.

FIG. 9 is a first example of a conductive shield 47D suitable for use with any of the configurations of the power cables 40-40C shown in FIGS. 5-8. The conductive shield 47D is urged into mechanical and electrical contact with the drain wire 44D by the outer insulator 48D. In the alternative, the drain wire 44D may be urged into mechanical and electrical contact with the conductive shield 47D by the outer insulator 48D. In this example, the conductive shield 47D is shown as a thin metallic foil 96D such as aluminum foil, copper foil or the like. Preferably, the thin metallic foil has a thickness of 0.001 to 0.005 inches.

FIG. 10 is a second example of a conductive shield 47E suitable for use with the configurations of the power cables 40A and 40C shown in FIGS. 10 and 12. The drain wire 44E is urged into mechanical and electrical contact with the conductive shield 47E by the outer insulator 48E. In this example, the conductive shield 47E is shown as a thin insulating polymeric material 95E with a metallic conductive coating 96E located on one side of the insulating polymeric material 95E. The metallic conductive coating 96E is located on the side of the insulating polymeric material 96E facing the drain wire 44E. One material suitable for use as the conductive shield 47E is a polyester film covered with an aluminum coating or a copper coating.

FIG. 11 is a third example of a conductive shield 47F suitable for use with any of the configurations of the power cables 40A-40C shown in FIGS. 9-12. The conductive shield 47F is urged into mechanical and electrical contact with the drain wire 44 by the outer insulator 48. In this example, the conductive shield 47F is shown as a thin insulating polymeric material 65F coated with metallic conductive coatings 96F and 97F located on opposed sides of the insulating polymeric material 95F. The metallic conductive coating 96F faces the drain wire 44F whereas the metallic conductive coating 797F faces the first and second wires 41 and 42.

FIG. 12 is a fourth example of a conductive shield 47G suitable for use with any of the configurations of the power cables 40A-40C shown in FIGS. 5-8. The conductive shield 47G is urged into mechanical and electrical contact with the drain wire 44G by the outer insulator 48G. In the alternative, the drain wire 44G may be urged into mechanical and electrical contact with the conductive shield 47G by the outer insulator 48G. In this example, the conductive shield 47G is shown as a thin organic conductive polymer 96G. The Wikipedia encyclopedia list the common classes of organic conductive polymers as poly(acetylene)s, poly(pyrrole)s, poly(thiophene)s, poly(aniline)s, poly(fluorene)s, polynaphthalenes, poly(p-phenylene sulfide), and poly(paraphenylene vinylene)s. Classically, these compounds are known as polyacetylene, polyaniline, etc. "blacks" or "melanins". The melanin pigment in animals is generally a mixed copolymer of polyacetylene, polypyrrole, and polyaniline.

FIG. 13 is a block diagram of the circuit 10 of the present invention for disconnecting an electrical power source 12 from the load 30 upon the detection of a leakage current within the power cable 40. In this example, the electrical power source 12 is shown as a conventional 110 volt alternating current (AC) power source. Although the electrical power source 12 has been shown as conventional 110 volt alternating current (AC) power source, it should be appreciated by those skilled in the art that the present invention may be adapted to virtually any type of power source.

The circuit 10 comprises a disconnect switch 50 shown as a disconnect switch interposed within the line and neutral wires 41 and 42 for disconnecting the power source 12 from the load 30. In this example, a latch 60 cooperates with the disconnect switch 50 as will be described in greater detail hereinafter.

A disconnect switch driver 70 is connected to the disconnect switch 50 for controlling the disconnect switch 50. The disconnect switch driver 70 opens the disconnect switch 50 upon a sensing circuit 80 sensing at leakage current from one of the first and second wires 41 and 42.

A sensing circuit 80 senses any leakage current between the one of the line and neutral wires 41 and 42 and the conductive shield 47.

The conductive shield 47 functions as shield sensing conductors for enabling the sensing circuit 80 for sensing a leakage current between the one of the line and neutral wires 41 and 42 and the conductive shield 47.

An optional amplifier circuit 90 interconnects the disconnect switch driver 70 and the sensing circuit 80 for opening the disconnect switch 50 upon the sensing circuit 80 sensing a leakage current within the power cable 40 for electrically disconnecting the power source 12 from the load 30 and completely electrically disconnecting the disconnect switch driver 70 and the sensing circuit 80.

Figure 15:
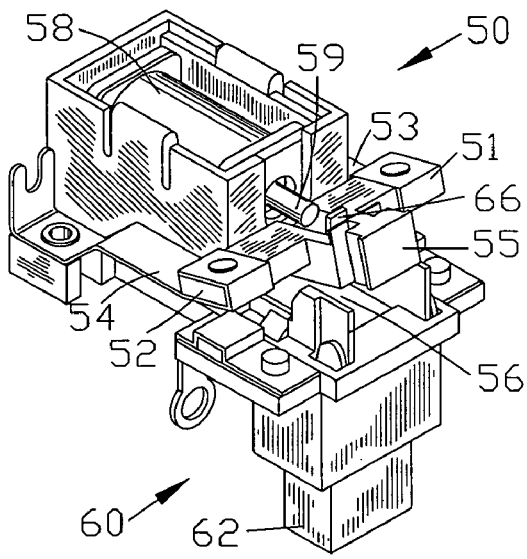
FIG. 15 is an isometric view of the disconnect switch of FIG. 14 in an open position.

FIGS. 14 and 15 are isometric views of an example of the disconnect switch 50 of FIG. 13 shown in a closed and an open position, respectively. It should be understood that the disconnect switch 50 of FIGS. 14 and 15 is merely an example of disconnect switches which is suitable for use with the circuit shown in FIG. 13 and that numerous other disconnect switches may be used with what the present invention.

In this example, the disconnect switch 50 comprises a first and a second switch 51 and 52 shown as resilient relay contacts 51 and 52 mounted on resilient metallic conductors 53 and 54. The resilient metallic conductors 53 and 54 bias the first and second switches 51 and 52 into an open position.

FIGS. 16-20 illustrate various positions of the operation of the disconnect switch 50 and the latch 60. An insulating switch operator 55 interconnects the first and second switches 51 and 52 for moving the first and second switches 51 and 52 in unison. The insulating switch operator 55 includes an aperture 56 defining a shoulder 57. The disconnect switch 50 includes a solenoid coil 58 for operating a plunger 59. The plunger 50 is located for movement adjacent to the aperture 56 in the insulating switch operator 55.

In this example, the latch 60 is shown as a mechanical latch comprising a reset button 62 having a return spring 64. The resent button 62 extends from the housing 20 as shown in FIGS. 1 and 2. A latch bar 66 having a latch shoulder 68 is connected to the reset button 62.

Figure 16:
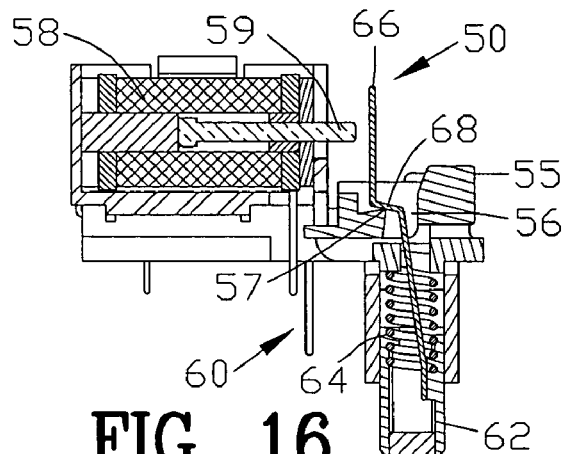
FIG. 16 is a side sectional view of the disconnect switch of FIG. 14 in the closed position.
Figure 16A:
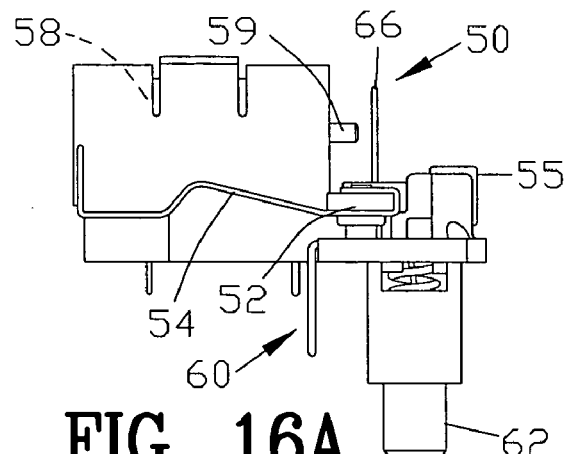
FIG. 16A is a side view of the disconnect switch shown in FIG. 16.

FIGS. 16 and 16A illustrate the disconnect switch 50 of FIG. 14 in the closed position. The latch shoulder 68 of the latch bar 66 engages with the shoulder 57 defined by the aperture of the switch operator 55. The return spring 64 is selected to be stronger than the resilient metallic conductors 53 and 54 biasing the first and second switches 51 and 52 into an open position. The return spring 64 retains the first and second switches 51 and 52 in the closed position against the urging of the resilient metallic conductors 53 and 54.

Figure 17:
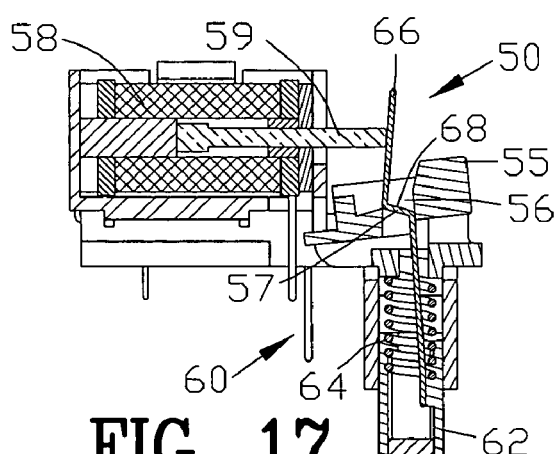
FIG. 17 is a side sectional view of the disconnect switch of FIG. 14 in a partially open position.
Figure 17A:
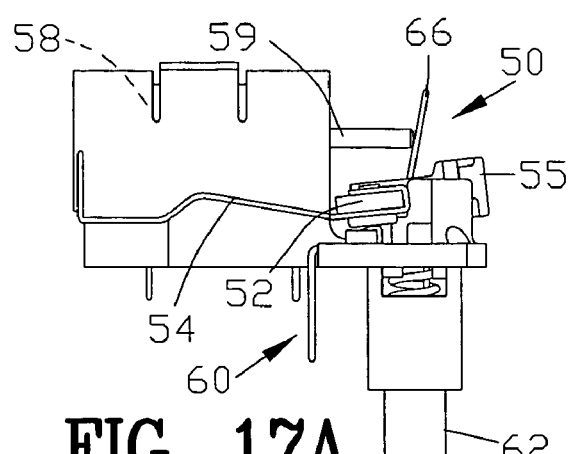
FIG. 17A is a side view of the disconnect switch shown in FIG. 17.

FIGS. 17 and 17A illustrate the disconnect switch 50 in a partially open position. An electrical current through the solenoid coil 58 extends the plunger 59 to displace the latch bar 66. The plunger 59 displaces the latch bar 66 to disengage the latch shoulder 68 of the latch bar 66 from the shoulder 57 of the switch operator 55. The disengagement of the latch shoulder 68 from the shoulder 57 permits the resilient metallic conductors 53 and 54 to bias the first and second switches 51 and 52 into the open position.

Figure 18:
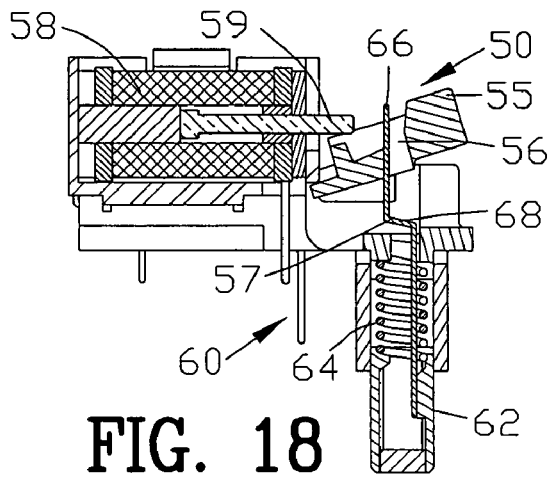
FIG. 18 is a side sectional view of the disconnect switch of FIG. 14 in a fully open position.
Figure 18A:
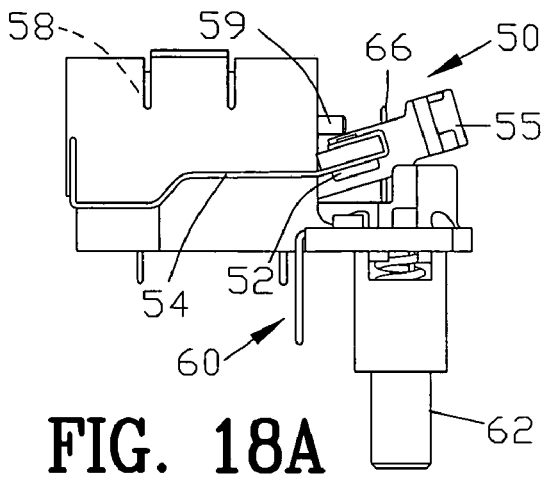
FIG. 18A is a side view of the disconnect switch shown in FIG. 18.

FIGS. 18 and 18A is a side sectional view of the disconnect switch 50 in a fully open position. The resilient metallic conductors 53 and 54 urge the first and second switches 51 and 52 into the open position. The first and second switches 51 and 52 remains in the open position until the disconnect switch 50 is manually reset.

Concomitantly therewith, the return spring 64 moves the reset button 62 into an extended position. The reset button 62 extends from the housing 20 as shown in FIGS. 1 and 2. The latch bar 66 and the latch shoulder 68 move in unison with the reset button 62.

Figure 19:
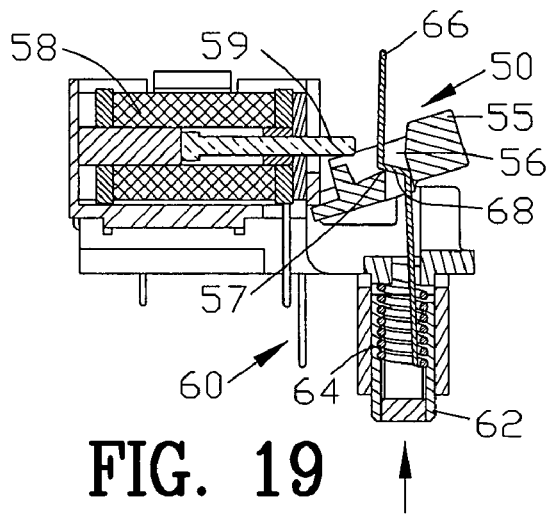
FIG. 19 is a side sectional view of the disconnect switch of FIG. 14 illustrating the reset of the latch relay with the latch being in the open position.
Figure 19A:
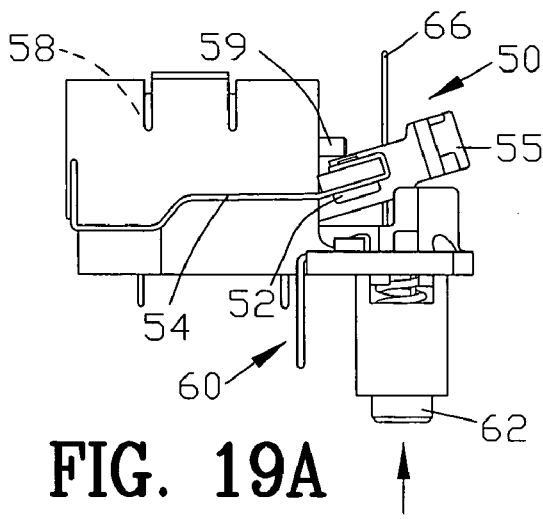
FIG. 19A is a side view of the disconnect switch shown in FIG. 19.

FIGS. 19 and 19A illustrate the movement of the reset button 62 by an operator to reset the disconnect switch 50. The reset button 62 is depressed against the urging of the return spring 64. The latch shoulder 68 of the latch bar 66 reengages with the shoulder 57 of the switch operator 55.

Figure 20:
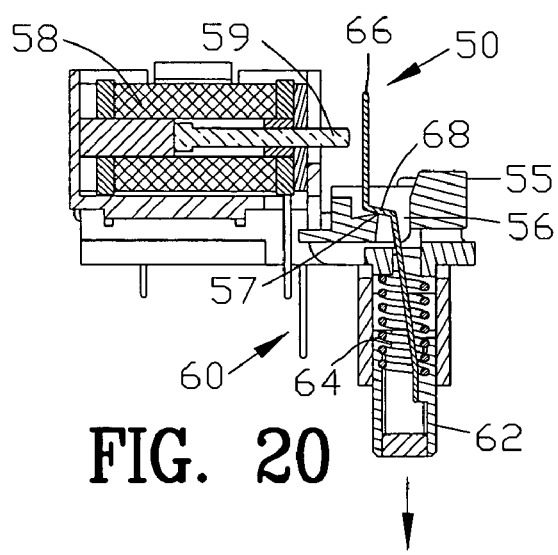
FIG. 20 is a side sectional view of the disconnect switch of FIG. 14 illustrating the latch relay reset into the closed position.
Figure 20A:
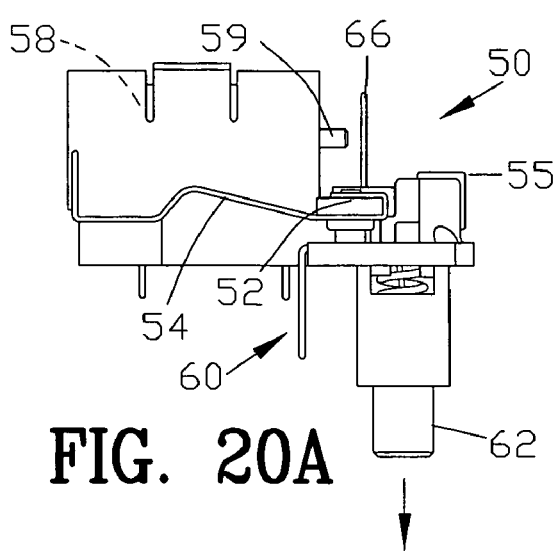
FIG. 20A is a side view of the disconnect switch shown in FIG. 20.

FIGS. 20 and 20A illustrate the fully reset disconnect switch 50. The return spring 64 moves the first and second switches 51 and 52 into the closed position against the urging of the urging of the resilient metallic conductors 53 and 54.

Although the disconnect switch 50 has been shown as a normally open, latch closed solenoid mechanism, it should be appreciated by those skilled in the art that various types of mechanical and or electrical switches may be utilized within the present invention for providing the structure and function of the disconnect switch 50.

Figure 21:
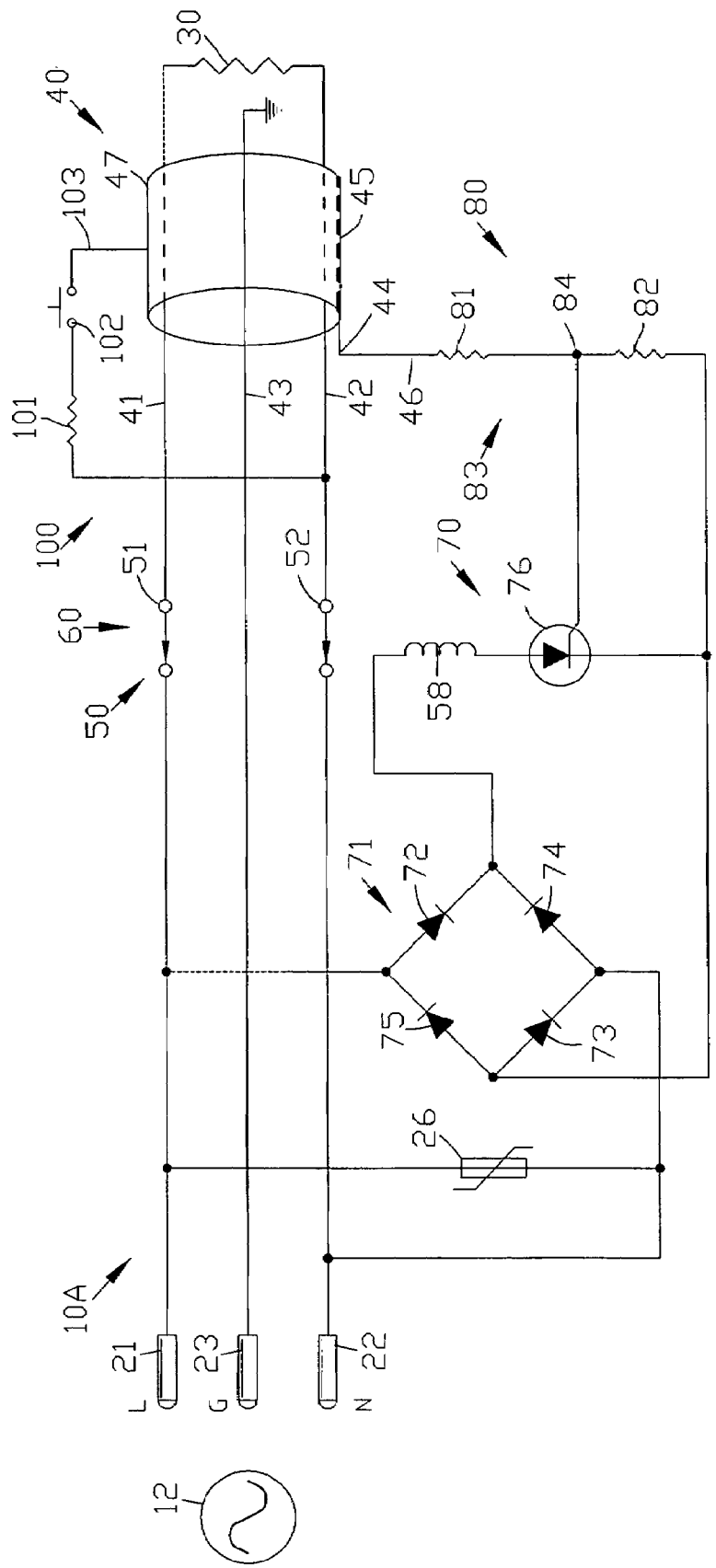
FIG. 21 is a circuit diagram of a first embodiment of the interrupter circuit of the present invention.

FIG. 21 is a circuit diagram of a first embodiment of the circuit 10A of FIG. 4. The line lug 21, the neutral lug 22 and the ground lug 23 extend from the housing 20 as shown in FIGS. 1-4. The line lug 21 and the neutral lug 22 are connected to and input side of the disconnect switch 50. The output side of the disconnect switch 50 is connected to the line wire 41 and the neutral wire 42 of the power cable 40. The disconnect switch 50 is shown in the closed or reset condition.

The optional ground wire 43 bypasses the disconnect switch 50 and passes to ground the load 30 in a conventional fashion. A surge suppressor shown as a metal oxide varistor 26 is connected across the line and neutral wires 41 and 42. The function and operation of the metal oxide varistor 26 should be well known to those skilled in the art.

The disconnect switch driver 70 opens the disconnect switch 50 upon the sensing circuit 80 sensing a leakage current from one of the wires 41-43. A solenoid coil 58 controls the disconnect switch 50. The solenoid coil 58 connected to the disconnect switch driver 70. In this embodiment of the invention, the disconnect switch driver 70 is shown as a thyristor or silicon controlled rectifier 76 connected in series with the solenoid coil 58 of the disconnect switch 50.

A full wave rectifier bridge 71 comprising diodes 72-75 is connected between the line lug 21 and the neutral lug 22 to supply direct current across the solenoid coil 58 and the thyristor 76. The full wave rectifier bridge provides power through the solenoid coil 58 of the disconnect switch 50 to the disconnect switch driver 70.

The sensing circuit 80 comprises resistor 81 and 82 forming a voltage divider network 83 defining a node 84. The voltage divider network 83 is connected to the gate of the thyristor 76. The drain wire 44 connects the resistor 81 of the voltage divider network 83 to the conductive shield 47. The node 84 of the voltage divider network 83 is connected to the gate of the thyristor 76.

An optional test circuit 100 may be included for testing the circuit 10A. The optional test circuit 100 comprises resistor 101 connected to the neutral wire 42 of the power cable 40. A momentary switch 102 connects the resistor 101 to the shield 47. It should be appreciated by those skilled in the art that the test circuit 100 maybe connected to any of the wires 41-43 of the power cable 40.

The operation of the interrupter circuit 10 in FIG. 21 is set forth below. The disconnect switch 50 is shown in the closed position with the latch shoulder 68 of the latch bar 66 engaging with the shoulder 57 defined by the aperture of the switch operator 55 as shown in FIGS. 16 and 16A. AC power is applied to the circuit 10 by inserting the line, neutral and ground lugs 21-23 extending from the housing 20 into the line, neutral and ground sockets 15-17 of the electrical receptacle 14 shown in FIG. 1. The AC power is transferred by the disconnect switch 50 to the line and neutral wires 41 and 42 of the power cable 40 to power the load 30.

The AC power is also applied to the full wave rectifier bridge 71 providing a direct current (DC) voltage for the disconnect switch driver 70. More specifically, the full wave rectifier bridge 71 applies a positive voltage from diodes 72 and 74 to the solenoid coil 58 and applies a negative voltage from diodes 73 and 75 to the cathode of the thyristor 76. The negative voltage from diodes 73 and 75 is also applied to the resistor 82 of the voltage divider circuit 83.

In the absence of a leakage current between the conductive shield 47 and any of the line wire 41 the neutral wires 42 or the ground wire 43, zero current will flow through the voltage divider circuit 83. With zero current flowing through the voltage divider circuit 83, there will be zero voltage drop across resister 82 and thyrister 76 will remain in a non-conducting state. As long as thyristor 76 is in a non-conducting state, the disconnect switch 50 remains in the closed or reset condition.

In the event of a leakage appearing between the conductive shield 47 and any of the line wire 41 the neutral wire 42 or the ground wire 43, the leakage current will flow through the voltage divider circuit 83. A voltage will appear across resistor 82 to trigger the thyristor 76 into a conducting state. The conduction of the thyristor 76 results in a current flow through the solenoid coil 58. The current flow through the solenoid coil 58 actuates the plunger 59 to open the disconnect switch 50 as shown in FIG. 18. The opening of the disconnect switch 50 disconnects the AC power to the power cable 40 and the load 30. Preferably, the voltage divider circuit 83 establishes a threshold for the leakage current to be less than 0.001 amperes to trigger the thyristor 76, but it should be understood that the threshold for the leakage current R1 may be established at any suitable value.

The test circuit 100 operates in a similar manner by simulating a leakage current between the conductive shield 47 and the neutral wire 42. As stated previously, the test circuit 100 maybe connected to any of the wires 41-43 of the power cable 40. A momentary depression of momentary switch 102 causes a test current to flow from the neutral wire 42 through resistor 101 and conductor 103 to the shield 47. The test current is passed by drain wire 44 to the voltage divider 83. A voltage will appear across resistor 82 to trigger the thyristor 76 into a conducting state. The conduction of the thyristor 76 results in a current flow through the solenoid coil 58 to actuate the plunger 59 for opening the disconnect switch 50 to disconnects the AC power to the power cable 40 and the load 30.

Figure 22:
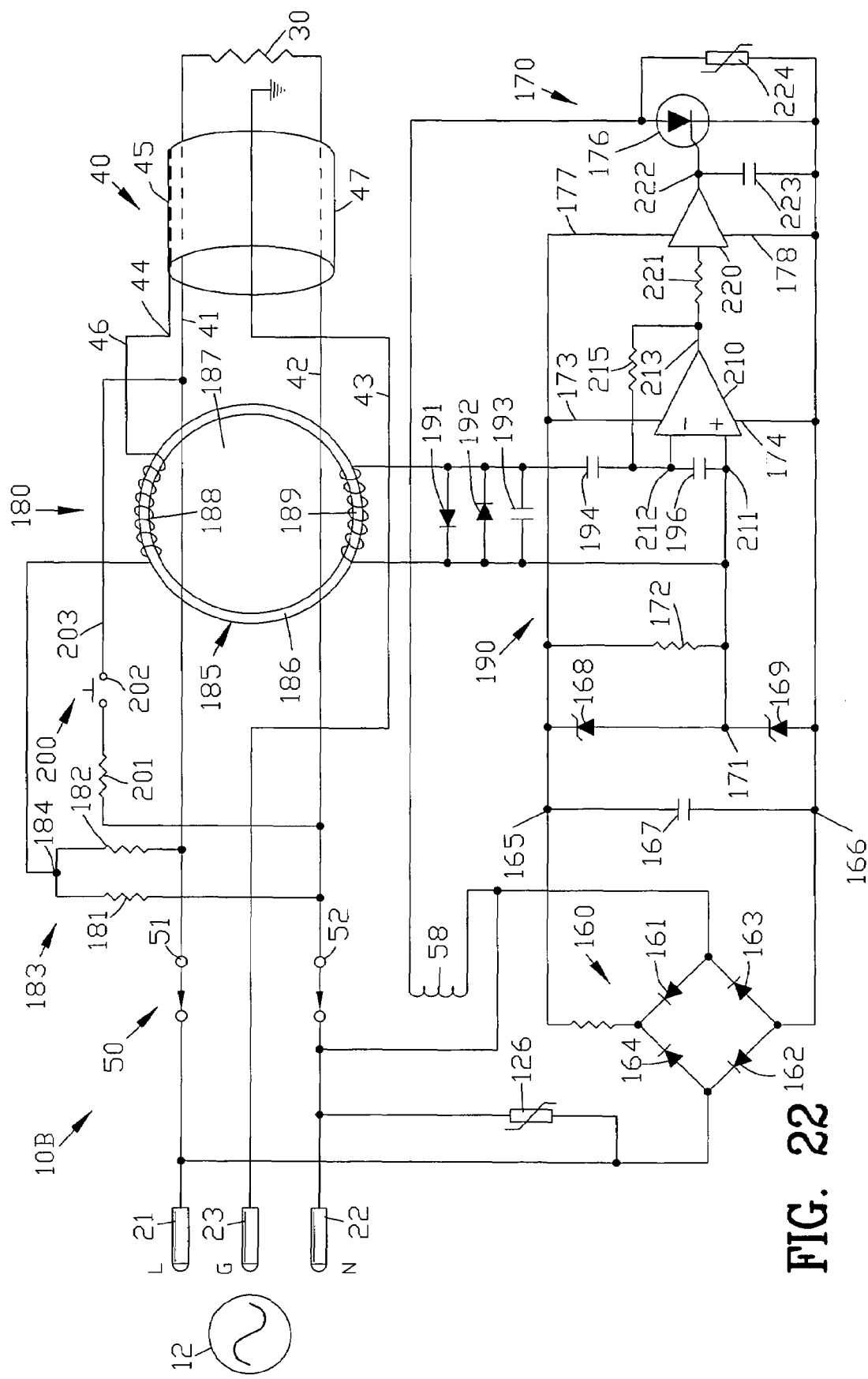
FIG. 22 is a circuit diagram of a second embodiment of the interrupter circuit of the present invention.

FIG. 22 is a circuit diagram of a second embodiment of the circuit 10B of FIG. 4. The line lug 21, the neutral lug 22 and the ground lug 23 extend from the housing 20 as shown in FIGS. 1-4. The line lug 21 and the neutral lug 22 are connected to the input side of the disconnect switch 50 shown in FIGS. 14 and 15.

The output side of the disconnect switch 50 is connected to the line wire 41 and the neutral wire 42 of the power cable 40.

The disconnect switch 50 is shown in the closed or reset condition. The optional ground wire 43 bypasses the disconnect switch 50 and passes to ground the load 30 in a conventional fashion. A surge suppressor shown as a metal oxide varistor 126 is connected across the line and neutral wires 41 and 42. The function and operation of the metal oxide varistor 126 should be well known to those skilled in the art.

A disconnect switch driver 170 opens the disconnect switch 50 upon a sensing circuit 180 sensing a leakage current from one of the wires 41-43. The solenoid coil 58 controls the disconnect switch 50. The disconnect switch driver 170 controls the solenoid coil 58. In this embodiment of the invention, the disconnect switch driver 170 is shown as a thyristor or silicon controlled rectifier 176 connected in series with the solenoid coil 58 of the disconnect switch 50.

A full wave rectifier bridge 160 comprising diodes 161-164 is connected between the line lug 21 and the neutral lug 22. The full wave rectifier bridge 160 supplies a pulsating DC voltage across the solenoid coil 58 of the disconnect switch 50 and the thyristor 176. More specifically, half wave power is applied from the neutral wire 22 through the solenoid coil 58 of the disconnect switch 50 and the disconnect switch driver 170 to diode 162 of the full wave rectifier bridge 160. Furthermore, the full wave rectifier bridge 160 supplies full wave power through conductors 165 and 166 to a filter capacitor 167. Zener diodes 168 and 169 regulate the voltage between conductors 165 and 166 as well as providing an intermediate voltage at node 171. A resistor 172 is connected across zener diode 168.

A sensing circuit 180 comprises resistor 181 and 182 forming a voltage divider network 183 defining a node 184. The resistors 181 and 182 are connected to the line lug 21 and the neutral lug 22 through the disconnect switch 150. The voltage divider network 183 provides an intermediate voltage at the node 184 between the voltage found on the line lug 21 and the voltage found on the neutral lug 22.

The sensing circuit 180 includes a differential transformer 185 comprising a transformer core 186 having a core opening 187. The line wire 41 and the neutral wire 42 extend through the core opening 187 of the transformer core 186 to function as primary windings of the differential transformer 185. The ground wire 43 is directed outside of the core opening 187 of the transformer core 186 to bypass the differential transformer 185.

A second primary winding 188 is wound about the transformer core 186 of the differential transformer 185. The second primary winding 188 is connected between the drain wire 44 and the node 184 of the voltage divider 183. Any leakage current flowing between the voltage divider 183 and the conductive shield 47 will pass through the second primary winding 188 and will induce a magnetic flux in the transformer core 186 of the differential transformer 185.

A secondary winding 189 is wound about the transformer core 186 of the differential transformer 185. Any magnetic flux induced in the transformer core 186 of the differential transformer 185 will produce a voltage across the secondary winding 189. The secondary winding 189 is connected to an amplifier circuit 190.

The amplifier circuit 190 comprises plural opposing diodes 191 and 192 and a capacitor 193 connected across the secondary winding 189. The plural opposing diodes 191 and 192 limit the voltage across the secondary winding 189 to the breakdown voltage of the plural opposing diodes 191 and 192. The capacitor 193 acts in concert with the secondary winding 189 to form a resonant circuit.

The amplifier circuit 190 includes a differential amplifier 210 having a non-inverting input 211 and an inverting input 212 and an output 213. One end of the secondary winding 189 is connected to the non-inverting input 211 of the differential amplifier 210. The other end of the secondary winding 189 is connected thorough capacitor 194 to the inverting input 212 of the differential amplifier 210. The non-inverting input 211 of the differential amplifier 210 is connected to the intermediate voltage at node 171 to fix the voltage at the non-inverting input 211. A capacitor 196 interconnects the differential inputs 211 and 212 for increasing the noise immunity at the non-inverting input 211 and the inverting input 212 of the differential amplifier 210.

Conductors 173 and 174 connect the regulated voltage from zener diodes 168 and 169 to power the differential amplifier 210. Conductors 177 and 178 connect the regulated voltage from zener diodes 168 and 169 to power a detector 220

A feedback resistor 215 connects the output 213 to the inverting input 212 of the differential amplifier 210. The selected value of the feedback resistor 215 establishes the trip level of the differential amplifier 210. The output 213 of the differential amplifier 210 is connected to the detector 220 by a resistor 221. An output 222 of the detector 220 is connected to the gate of the thyristor 176. A capacitor 223 is connected between the gate and the cathode of the thyristor 176 to prevent transients from actuating the thyristor 176. A surge suppressor shown as a metal oxide varistor 224 is connected to shunt any transients across the thyristor 176.

The operation of the interrupter circuit 10B in FIG. 22 is set forth below. The disconnect switch 50 is shown in the closed position with the latch shoulder 68 of the latch bar 66 engaging with the shoulder 57 defined by the aperture of the switch operator 55 as shown in FIGS. 16 and 16A. AC power is applied to the circuit 10B by inserting the line, neutral and ground lugs 21-23 extending from the housing 20 into the line, neutral and ground sockets 15-17 of the electrical receptacle 14 shown in FIG. 1. The AC power is transferred by the disconnect switch 50 to the line and neutral wires 41 and 42 of the power cable 40 to power the load 30.

Under normal operation, the current flow through line wire 41 is equal and opposite to the current flow through the neutral wire 42. The equal and opposite current flow through line wire 41 and the neutral wire 42 produces a net magnetic flux of zero in the transformer core 186 of the differential transformer 185. A net magnetic flux of zero in the transformer core 186 of the differential transformer 185 produces no voltage across the secondary winding 189. When a zero voltage appears across the secondary winding 189, the differential amplifier 210 and the detector 220 maintain thyristor 176 in a non-conducting state. As long as thyristor 176 is in a non-conducting state, the disconnect switch 50 remains in the closed or reset condition.

In the absence of a leakage current between the conductive shield 47 and any of the line wire 41 the neutral wires 42 or the ground wire 43, zero current will flow through the drain wire 44 and the second primary winding 188 and the voltage divider 183. A zero current flow through the second primary winding 188 produces a magnetic flux of zero in the transformer core 186 of the differential transformer 185. A net magnetic flux of zero in the transformer core 186 of the differential transformer 185 produces no voltage across the secondary winding 189. The zero voltage across the secondary winding 189 maintains thyristor 176 in a non-conducting state and the disconnect switch 150 remains in the closed or reset condition.

In the event of a leakage current appearing between the conductive shield 47 and any of the line wire 41 the neutral wire 42 or the ground wire 43, the leakage current will flow through the drain wire 44 and the second primary winding 188 and the voltage divider 183. A leakage current flowing through the second primary winding 188 produces a magnetic flux in the transformer core 186 of the differential transformer 185. A magnetic flux in the transformer core 186 of the differential transformer 185 produces a voltage across the secondary winding 189. The voltage across the secondary winding 189 is applied to the differential amplifier 210. The differential amplifier 210 amplifies the voltage in the secondary winding 189 to provide a signal on the output 213. The signal on the output 213 is applied to the detector 220 to actuate thyristor 176 into a conducting state. The conduction of the thyristor 176 results in a current flow through the solenoid coil 58. The current flow through the solenoid coil 58 actuates the plunger 59 to open the disconnect switch 50 as shown in FIG. 18. The opening of the disconnect switch 50 disconnects the AC power to the power cable 40 and the load 30.

A ground fault condition exits when the current flow through line wire 41 is not equal and opposite to the current flow through the neutral wire 42. A ground fault condition may be produced by numerous conditions including a leakage current to the ground wire 43, a leakage current in the load or any other leakage current.

Under a ground fault condition, an unequal and opposite current flows through the wire 41 and the neutral wire 42 extending through the core opening 187 of the transformer core 186 of the differential transformer 185. The unequal and opposite current flow through line wire 41 and the neutral wire 42 produces a net magnetic flux in the transformer core 186 of the differential transformer 185. A magnetic flux in the transformer core 186 of the differential transformer 185 produces a voltage across the secondary winding 189. The differential amplifier 210 amplifies the voltage in the secondary winding 189 to actuate thyristor 176 into a conducting state. The conduction of thyristor 176 opens the disconnect switch 50 to disconnect the AC power to the power cable 40 and the load 30.

The test circuit 200 operates in a similar manner by simulating a ground fault condition. A momentary depression of momentary switch 202 causes a test current to flow from the neutral wire 42 through resistor 201 and conductor 203 and the line wire 41. The test current bypasses the differential transformer 185 to produce a magnetic flux in the transformer core 186 of the differential transformer 185. A magnetic flux in the transformer core 186 produces a voltage in the secondary winding 189. The differential amplifier 210 amplifies the voltage in the secondary winding 189 to actuate thyristor 176 into a conducting state. The conduction of thyristor 176 opens the disconnect switch 50 to disconnect the AC power to the power cable 40 and the load 30.

The improved conductive shield may be utilized within a circuit for disconnecting a power source upon the detection of a leakage current within a power cable as shown in FIG. 21. The improved conductive shield may be utilized within a circuit for disconnecting a power source upon the detection of a leakage current within a power cable as well as a ground fault as shown in FIG. 22.

Although the invention has been shown as a 120 volt single phase system or a 240 volt single phase system, it should be appreciated that the present invention is equally applicable to virtually all single phase and polyphase systems.

The present invention provide a circuit for disconnecting a power source upon the detection of a leakage current that incorporates an improved conductive shield for the detection of a leakage current. The incorporation of the improved conductive shield provides a more economical solution than similar units of the prior art. The improved conductive shield may be incorporated into existing line cord packages.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An interrupter circuit for interrupting power from a power source, comprising
a power cable comprising an insulated line wire and an insulated neutral wire;
said power cable having a conductive shield surrounding said insulated line wire and said insulated neutral wire;
a drain wire having a first and a second portion;
said first portion of said drain wire being non-insulated and in contact with said conductive shield;
an outer insulating layer molded about said conductive shield;
a disconnect switch interposed between the power source and said power cable;
a disconnect switch driver for controlling said disconnect switch;
a sensing circuit comprising a differential transformer including a transformer core having a core opening;
a first primary winding comprising said insulated line wire and said insulated neutral wire extending through said core opening;
a secondary winding wound about said transformer core connected to said disconnect switch driver for opening said disconnect switch upon said secondary winding detecting an imbalance in the magnetic flux in said transformer core;
a voltage divider circuit connected across one of said power source and said power cable for providing a voltage node; and
a second primary winding wound about said transformer core interconnecting said second portion of said drain wire and said voltage node for creating an imbalance in the magnetic flux in said transformer core upon sensing a leakage current between said conductive shield and one of said insulated line wire and said insulated neutral wire for opening said disconnect switch for disconnecting said power cable from the power source.

2. An interrupter circuit as set forth in claim 1, wherein said conductive shield is a metallic foil.

3. An interrupter circuit as set forth in claim 1, wherein said conductive shield comprises a metallic mesh.

4. An interrupter circuit as set forth in claim 1, wherein said conductive shield comprises a polymeric material with a metallic conductive coating.

5. An interrupter circuit as set forth in claim 1, wherein said conductive shield comprises an organic conductive polymeric material.

6. An interrupter circuit as set forth in claim 1, wherein said first portion of said drain wire extends along substantially the total length of said conductive shield.

7. An interrupter circuit as set forth in claim 1, wherein said drain wire is located internal to said conductive shield.

8. An interrupter circuit as set forth in claim 1, wherein said drain wire is located external to said conductive shield.

9. An interrupter circuit as set forth in claim 1, wherein said outer insulating layer establishes a mechanical engagement between said first portion of said drain wire and said conductive shield to provide an electrical connection between said drain wire and said conductive shield.

10. An interrupter circuit as set forth in claim 1, wherein said outer insulating layer establishes a resilient mechanical engagement between said first portion of said drain wire and said conductive shield to provide an electrical connection between said drain wire and said conductive shield.

11. An interrupter circuit as set forth in claim 1, including a housing having a line lug and a neutral lug for insertion within a line socket and a neutral socket and said ground socket of the power source; and
   said disconnect switch and said sensing circuit and said disconnect switch driver being located with in said housing.

12. An interrupter circuit as set forth in claim 1, including a housing molded from a polymeric material;
   a line lug and a neutral lug extending from said housing for insertion within a line socket and
   a neutral socket of the power source; and
   said disconnect switch and said sensing circuit and said disconnect switch driver being located with in said housing.

13. An interrupter circuit as set forth in claim 1, wherein said disconnect switch comprises a disconnect switch coil for changing said disconnect switch from a closed position connecting said power cable to the power source and an open position for disconnecting said power cable from the power source; and
   said disconnect switch driver interconnecting said sensing circuit with said disconnect switch coil for changing said disconnect switch into said open position upon said sensing circuit sensing said leakage current for disconnecting said power cable from the power source.

14. An interrupter circuit as set forth in claim 1, wherein said disconnect switch driver comprises a thyristor connected in series with said disconnect switch for changing said disconnect switch into said open position upon conduction of said thyristor.

15. An interrupter circuit as set forth in claim 1, wherein said disconnect switch driver comprises a thyristor connected to said disconnect switch; and
   an amplifier interposed between said sensing circuit and said thyristor of said disconnect switch driver for changing said disconnect switch into said open position upon conduction of said thyristor.

16. An interrupter circuit for disconnecting a power source from a load, the power source having a line socket and a neutral socket, comprising:
   a housing having a line lug and a neutral lug for insertion within said line socket and said neutral socket of the power source;
   a power cord comprising an insulated line wire and an insulated neutral wire;
      said power cord having a conductive shield surrounding said insulated line wire and said insulated neutral wire;
      a non-insulated drain wire contacting said conductive shield;
      an outer insulating layer molded about said conductive shield;
   a disconnect switch located in said housing interconnecting said line lug and said neutral lug of said housing to said insulated line wire and said insulated neutral wire of said power cord;
   said disconnect switch having a closed position whereat the power source is connected to the load and having an open position whereat the power source is disconnected from the load;
   a disconnect switch driver located in said housing for controlling said disconnect switch; and
   a sensing circuit located in said housing comprising a differential transformer including a transformer core having a core opening;
   a first primary winding comprising said insulated line wire and said insulated neutral wire extending through said core opening;
   a secondary winding wound about said transformer core connected to said disconnect switch driver for opening said disconnect switch upon said secondary winding detecting an imbalance in the magnetic flux in said transformer core;
   a resistive voltage divider circuit connected across one of said power source and said power cable for providing a voltage node; and
   a second primary winding wound about said transformer core interconnecting said non-insulated drain wire and said voltage node for creating an imbalance in the magnetic flux in said transformer core for changing said disconnect switch into said open position upon a leakage current between said conductive shield and one of said insulated line wire and said insulated neutral wire to disconnect said power cord from the power source.

* * * * *